US005478371A

United States Patent [19]
Lemaire et al.

[11] Patent Number: 5,478,371
[45] Date of Patent: Dec. 26, 1995

[54] METHOD FOR PRODUCING PHOTOINDUCED BRAGG GRATINGS BY IRRADIATING A HYDROGENATED GLASS BODY IN A HEATED STATE

[75] Inventors: Paul J. Lemaire, Madison; William A. Reed, Summit; Ashish M. Vengsarkar, Chatham, all of N.J.

[73] Assignee: AT&T Corp., Murray Hill, N.J.

[21] Appl. No.: 305,235

[22] Filed: Sep. 13, 1994

Related U.S. Application Data

[63] Continuation-in-part of Ser. No. 56,329, Apr. 30, 1993, abandoned, which is a continuation-in-part of Ser. No. 10,237, Jan. 28, 1993, Pat. No. 5,287,427, which is a continuation-in-part of Ser. No. 878,802, May 5, 1992, Pat. No. 5,235,659.

[51] Int. Cl.$^6$ ..................................................... C03B 37/10
[52] U.S. Cl. .................. 65/384; 65/386; 65/397; 65/425; 65/30.11; 65/424; 65/111
[58] Field of Search .................. 65/386, 387, 392, 65/425, 30.11, 424, 384, 111

[56] References Cited

U.S. PATENT DOCUMENTS

| | | | |
|---|---|---|---|
| 4,474,427 | 10/1984 | Hill et al. | 350/96.3 |
| 4,504,297 | 3/1985 | Kosinski et al. | 65/3.11 |
| 4,725,110 | 2/1988 | Glenn et al. | 350/3.61 |
| 4,856,859 | 8/1989 | Imoto | 350/96 |
| 4,979,976 | 12/1990 | Havens | 65/30.11 |
| 5,104,209 | 4/1992 | Hill et al. | 385/27 |
| 5,235,659 | 8/1993 | Atkins | 385/124 |
| 5,267,343 | 11/1993 | Lyons et al. | 385/141 |
| 5,271,024 | 12/1993 | Huber | 372/6 |
| 5,287,427 | 2/1994 | Atkins et al. | 385/124 |
| 5,327,515 | 7/1994 | Anderson et al. | 385/123 |
| 5,367,588 | 11/1994 | Hill | 385/37 |

OTHER PUBLICATIONS

Translation of West German Patent No. 2,843,276, issued in W. Germany on Sep. 1979 to Siemens.
G. D. Maxwell, et al. "UV written 13dB Reflection Filters in Hydrogenated Low Loss Planar Silica Waveguides", *Electronics Letters*, vol. 29, No. 5, pp. 425–426 (1993).
R. M. Atkins, et al. "Effects of elevated temperature hydrogen exposure on short-wavelength optical losses and defect concentrations in germanosilicate optical fibers", *J. Appl. Phys.*, vol. 72, pp. 344–348 (1992).

Primary Examiner—David A. Simmons
Assistant Examiner—John Hoffman
Attorney, Agent, or Firm—Glen E. Books

[57] ABSTRACT

In accordance with the invention, the index of refraction of a region of a glass body is selectively increased by treating the material with hydrogen and then simultaneously applying heat and actinic radiation to the region. Preferably the body is heated to a temperature in excess of 150° C. and the heat and radiation are simultaneously applied. The result is a substantial and long-lived increase in excess of $5\times10^{-5}$ in the refractive index of the irradiated region. This process can be used to make and adjust a variety of optical waveguide devices such as photoinduced Bragg gratings.

9 Claims, 4 Drawing Sheets

METHOD FOR PRODUCING PHOTOINDUCED BRAGG GRATINGS BY IRRADIATING A HYDROGENATED GLASS BODY IN A HEATED STATE

CROSS-REFERENCE TO RELATED APPLICATION

This application is a continuation-in-part of U.S. patent application Ser. No. 08/056,329 filed Apr. 30, 1993, now abandoned, which is a continuation-in-part of application Ser. No. 08/010,237 filed Jan. 28, 1993, now U.S. Pat. No. 5,287,427, which, in turn, is a continuation-in-part of Ser. No. 07/878,802 filed May 5, 1992, now U.S. Pat. No. 5,235,659.

FIELD OF THE INVENTION

The present invention relates to methods for making photoinduced Bragg gratings.

BACKGROUND OF THE INVENTION

Photoinduced Bragg gratings are passive components with considerable potential in future telecommunications systems. In essence the gratings are lengths of optical waveguide, such as optical fiber, in which periodic variations of the refractive index have been induced. These periodic variations act as a Bragg grating, and selectively reflect light having a wavelength of twice the spacing. Such gratings can be used to filter, to define laser cavities and as components in multiplexers and demultiplexers.

Photoinduced Bragg gratings have been made in a variety of ways. An early approach was to form a reflecting surface on a short length of germanium glass optical fiber and to transmit a strong infra-red laser beam down the fiber to set up an interference pattern. Index perturbations occur at the maximum intensities. See U.S. Pat. No. 4,474,427 issued to Kenneth O. Hill et al, which is incorporated herein by reference. A second approach is to direct two interfering beams of ultraviolet radiation through the cladding of an optical fiber to form an interference pattern along a germanium-doped glass core. See, for example, U.S. Pat. No. 4,725,110 issued to Glenn et al. which is incorporated herein by reference. Another technique is to subject periodic regions of a fiber core to ultraviolet radiation, as through an amplitude mask. See U.S. Pat. No. 5,104,209 issued to K. O. Hill et al. which is incorporated herein by reference. And yet another approach uses a phase mask. See U.S. Pat. No. 5,327,515 issued to D. Z. Anderson et al. which is incorporated herein by reference.

The present applicants have discovered and disclosed in the aforementioned parent applications that the index-changing effect of actinic (UV) radiation can be enhanced by treating the glass with hydrogen or deuterium (Ser. No. 07/878,802 now issued as U.S. Pat. No. 5,287,427). They have further discovered that in hydrogen or deuterium-treated glass (hereinafter generically referred to as hydrogen-treated glass), the index of refraction can be increased not only by actinic radiation, but also by the application of heat (Ser. No. 08/056,329).

The present application is predicated upon the further discovery that in hydrogen treated glass, the alteration of the index of refraction can be substantially enhanced by simultaneously applying heat and actinic radiation.

SUMMARY OF THE INVENTION

In accordance with the invention, the index of refraction of a region of a glass body is selectively increased by treating the material with hydrogen and then simultaneously applying heat and actinic radiation to the region. Preferably the body is heated to a temperature in excess of 150° C. and the heat and radiation are simultaneously applied. The result is a substantial and long-lived increase in excess of $5\times10^{-5}$ in the refractive index of the irradiated region. This process can be used to make and adjust a variety of optical waveguide devices such as photoinduced Bragg gratings.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
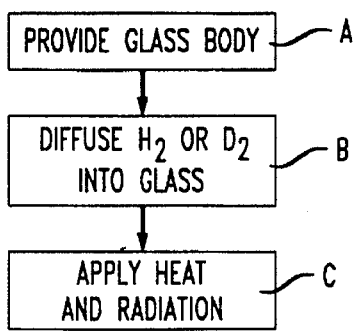
FIG. 1 is a block diagram showing the steps of an exemplary process for increasing the index of refraction of portions of a glass body.

Referring to the drawings, FIG. 1 illustrates the steps of an exemplary process for increasing the index of refraction of a local region of a glass body.

Figure 2:
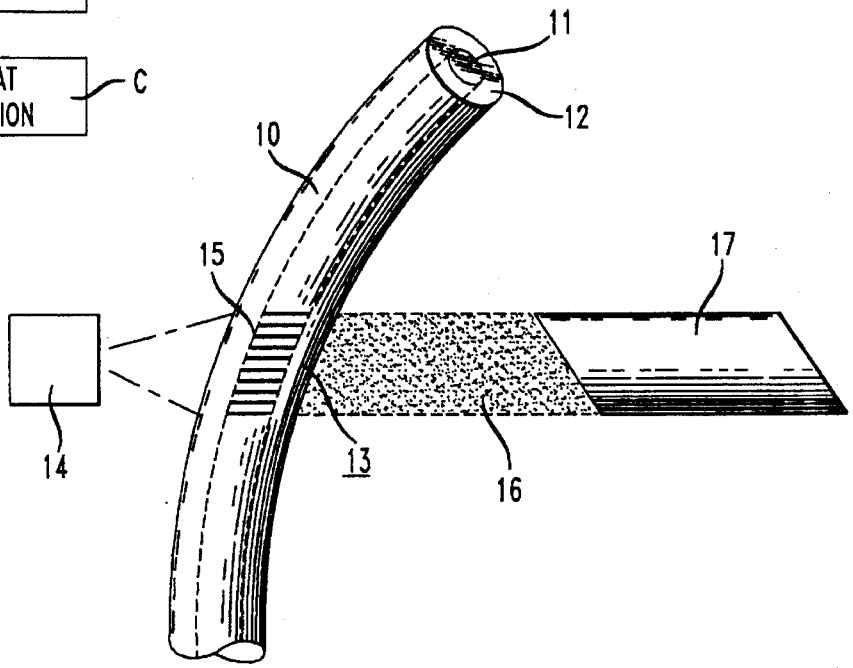
FIGS. 2 and 3 illustrate glass bodies upon which the process of FIG. 1 can be used.
Figure 3:
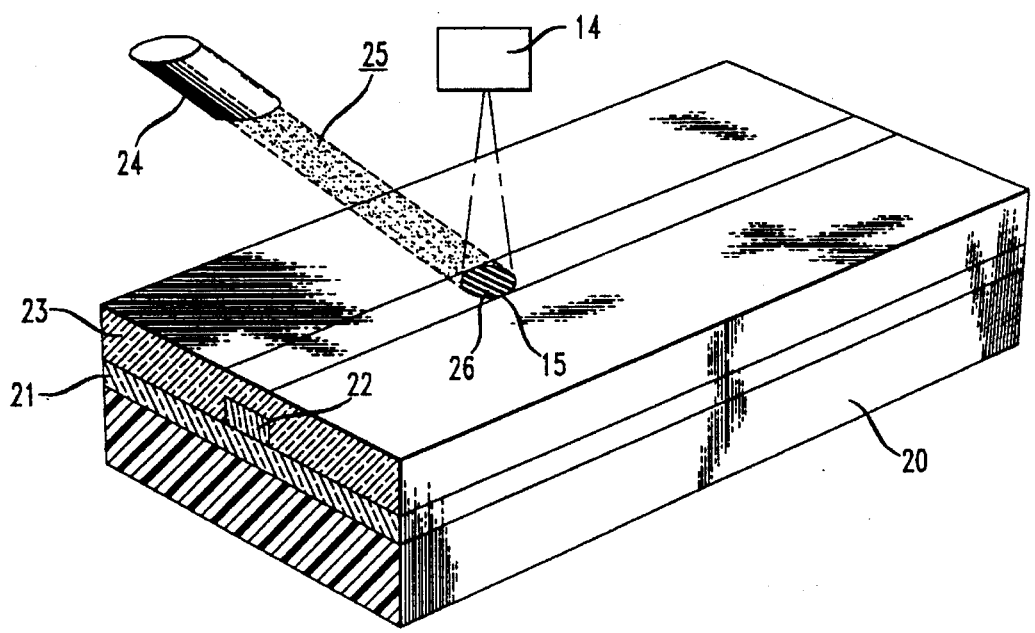

As shown in FIG. 1A, the first step is to provide a body of glass. The body can be any of a wide variety of forms. Forms particularly preferred for this process are illustrated in FIGS. 2 and 3. They include optical fiber (FIG. 2) and substrate-supported thin layers for planar optical waveguide devices (FIG. 3). Preferably the glass is a transparent glass doped with germanium such as $GeO_2$ doped silica. However, the method has been found to work in other types of transparent glass such as phosphorus doped silica. Typical $GeO_2$ concentrations in silica are in the range 3–20 mole % $GeO_2$, with higher index changes observed for higher $GeO_2$ concentrations. Typical $P_2O_5$ concentrations in silica are in the range 3–10 mole %.

The next step shown in FIG. 1B is to diffuse hydrogen (or deuterium) into the glass body at least in those regions whose refractive index is to be increased. Preferably this diffusion is effected by exposing the body to hydrogen or deuterium gas at a pressure in the range 14–11,000 p.s.i. Advantageously, the diffusion takes place at low to moderate temperatures in the range 21°–250° C.

Diffusion times depend on the temperature and the thickness of the glass to be loaded. Typical diffusion times for standard sized optical fibers vary from about 12 days at 21° C. to about 10 hours at 100° C. More generally, the time required for the $H_2$ loading of a fiber of radius r is proportional to $r^2$ and inversely proportional to the diffusivity of $H_2$ in the glass.

Since the radiation induced reactions usually occur only at localized portions of the glass body, it is possible to make use of $H_2$ that can diffuse from surrounding areas. For example, for a single mode fiber a significant amount of $H_2$ can diffuse from the cladding material into the $GeO_2$ doped core, thus permitting maximum index changes to be achieved in the core even though the $H_2$ concentration may be less than the $GeO_2$ concentration. It is believed that the pertinent reaction involves at least one H atom per Ge atom. In fabrication, the amount of loaded hydrogen at equilibrium varies jointly with the pressure of hydrogen and jointly with an exponential factor exp $$\left[ \frac{2.07 \text{ kcal/mole}}{RT} \right].$$

The third step shown in FIG. 1C is to heat the hydrogen-loaded glass and simultaneously apply actinic radiation to the region whose refractive index is to be increased. Preferably the glass is heated rapidly to a temperature in excess of 150° C. and even more preferably to a temperature in the range 200° C. to 450° C. The glass body can be heated by any method for rapid heating. Preferably it is heated by infrared radiation from a $CO_2$ laser. The heating can be general or local.

The actinic radiation is preferably ultraviolet radiation, as from an excimer laser. It can be pulsed or continuous wave. The period for simultaneous exposure can be less than the period required for out-diffusion of hydrogen from the glass at the temperature used (e.g. less than 14 mins. at 250° C. and less than 1.8 mins at 400° C.). Longer exposures to heat, actinic radiation or both can be used, but only with diminished marginal effect on the index of refraction. Additional heating, however, can enhance the long term stability of the UV-induced index changes.

The preferred application of the invention is for increasing the refractive index of selected portions of glass fiber or a glass layer to form or modify optical waveguide structures. An optical waveguide typically comprises an elongated glass structure including a core of relatively high refractive index glass and a cladding of lower refractive index glass at least partially surrounding the core. The dimensions of the core are chosen and adapted for transmitting in the longitudinal direction electromagnetic radiation of optical wavelength typically in the range 0.8 to 1.7 micrometers. FIG. 2 illustrates such a waveguiding body in the form of an optical fiber 10 having a cylindrical core 11 surrounded by a concentric cladding 12. For communications fibers, the core is typically germanium-doped silica. As shown, a convenient way of applying heat to a region 13 of said fiber is to apply infrared radiation 16 from a line focussed $CO_2$ laser 17.

In a preferred application, the actinic radiation (e.g. UV radiation) is simultaneously applied from a UV source 14 to heated region 13 in a pattern with periodic intensity peaks 15 to form a photoinduced grating. Such patterned exposure can be achieved by use of interfering beams, an amplitude mask, or a phase mask as described in the aforementioned '427, '110, '209, and '515 patents.

FIG. 3 illustrates a waveguiding body in planar form, typically comprising a substrate 20, a thin cladding layer 21 disposed upon the substrate, a core glass layer 22 on the cladding and a top cladding layer 23. Planar waveguides for communications applications typically have phosphorus-doped silica cores. The basic structure of conventional planar waveguides is described in C. H. Henry et al., "Glass Waveguides On Silicon For Hybrid Optical Packaging", 7 J. Lightwave Technol., pp. 1530–39 (1989). Typically, all but a thin stripe of the core layer is etched away prior to application of the top cladding in order to define the waveguiding region.

As shown, a convenient way to heat selected regions of the planar waveguide structure is to direct a laser 24, such as a $CO_2$ laser, to apply infrared radiation 25 onto a portion 26 of the structure.

In a preferred application, the actinic radiation (e.g. UV radiation from an excimer laser) is simultaneously applied from source 14 to heated region 26 in a pattern with intensity peaks 15 to form a photoinduced grating. Another advantageous application is to apply uniform UV radiation to a heated region of a waveguide or existing grating in order to adjust the average refractive index of the device.

The operation and applications of the invention can be understood in greater detail by consideration of the following examples. In the examples, optical fibers were loaded with molecular hydrogen or deuterium. Control experiments were done using identical fibers without hydrogen loading. Hydrogen or deuterium loading was typically done at about 440 atm and 50° C. over a time span of about 3–4 days. The hydrogen loading forces $H_2$ molecules into interstitial sites in the glass. The diffusion process is substantially reversible—if the fibers are not UV exposed or heated, the $H_2$ diffuses out of the fiber over the course of several days at room temperature.

Pulsed UV exposures were typically done using a KrF laser operating at 248 nm. The laser generated 15 nsec pulses, typically at 20 Hz. The intensity was typically in the range of 160–450 $mJ/cm^2$/pulse, with a typical irradiated fiber length of about 10–25 min. The experiments involving CW ultraviolet irradiation used an intracavity frequency-doubled argon laser operating at 244 nm with an output of up to about 150 mW. (Coherent Innova 300 FReD.) For both pulsed and CW experiments the active heating of the fibers was done by directing a hot air gun at the fiber while it was being exposed to the UV. Temperatures were measured using a small thermocouple positioned next to the fiber. The duration of the exposures were dictated by hydrogen diffusivities at the elevated temperatures. For instance, at 250° C. the time required for $H_2$ to diffuse out of the fiber core is about 14 minutes, with about half of the hydrogen leaving the core in only 5 minutes. UV exposures were generally not run for times longer than that required to diffuse the $H_2$ out of the fiber core.

In a number of cases loss changes were measured during the UV exposures. From past experiments it was known that the induced Si—OH levels could be used to estimate the induced refractive index changes. The loss change measurements were done using either a white light source or an edge emitting LED, and an optical spectrum analyzer.

Refractive index changes were measured using a York fiber profiler. In practice the profiler can be used to detect index changes as small as about $2 \times 10^{-4}$. For index changes less than about $5 \times 10^{-4}$ several similar samples were measured to verify the values of the index changes.

EXAMPLE 1

$GeO_2$ Doped Fibers

Figure 4:
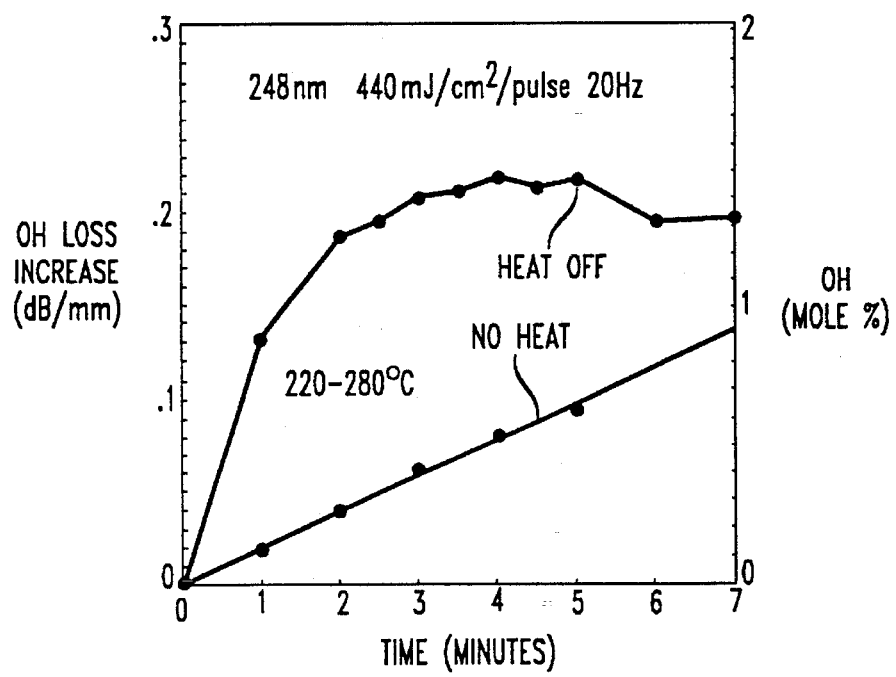
FIGS. 4–9 are graphical illustrations demonstrating the effect of the process in altering the index of refraction.

Samples of a standard AT&T 5D single mode fiber were loaded with $H_2$ to a level of about 3.4 mole % (moles of $H_2$ per mole of $SiO_2$). Prior to UV exposure the fiber coating was removed and the fiber was positioned in the beam path of the KrF excimer laser. In the first experiment an $H_2$ loaded fiber was UV exposed at an estimated intensity of about 435 $mJ/cm^2$/pulse. The exposed fiber length was 25 mm. Heat (when used) was supplied by a Master-Mite heat gun using a 340 W nozzle. The nozzle was about 25 mm away from the fiber and the air flow was directed downward onto the fiber. The temperature was about 250° C., but showed significant (±30° C.) variations over the UV exposed region. Another sample was exposed without using any direct heating. FIG. 4 shows the OH growth as a function of time for the heated and for the unheated sample. The initial OH growth rate was significantly enhanced by the heating. The OH growth saturated in the heated sample after about 3 minutes, due to depletion of the two "reactants"—Ge sites and dissolved $H_2$. Ge sites tend to be depleted as the reaction proceeds and $H_2$ is lost both by reaction and by out-diffusion.

Figure 5:
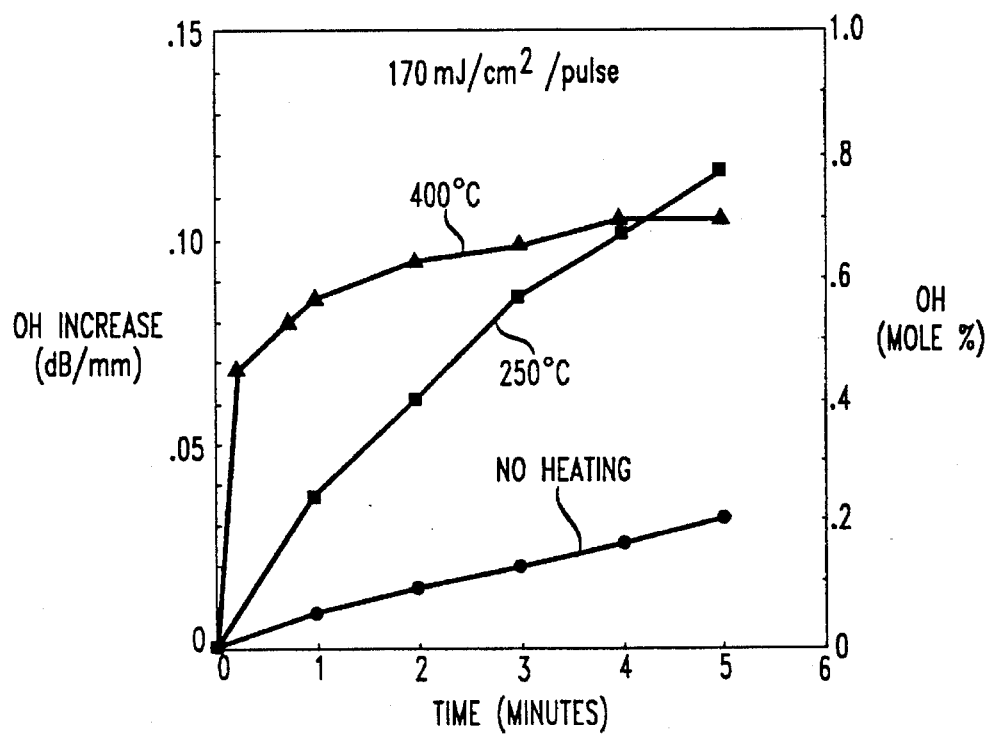

In another experiment similar 5D fibers were used, loaded with either $H_2$ or $D_2$. The UV intensity was lower, about 170 mJ/cm²/pulse, and fibers were heated both at 250° and 400° C. (In these exposures the temperatures variations noted previously had been reduced.) FIG. 5 shows the OH increases versus time for heated and unheated fibers. Again, the initial rate was clearly a strong function of the temperature. The OH level in the 400° C. fiber saturated after several minutes, consistent with a predicted time of about 1.8 minutes for 95% of the $H_2$ to diffuse out of the core. The initial growth rates at 250° and 400° C. were about 4.3 and 32 times higher than the rate in the unheated fiber, respectively. The refractive index profiles of the fibers from this experiment were measured after the UV exposure. The index increases (Δn) in the unheated, 250° C. and 400° C. heated fibers were 0.0011, 0.0022 and 0.0028, respectively.

Figure 6:
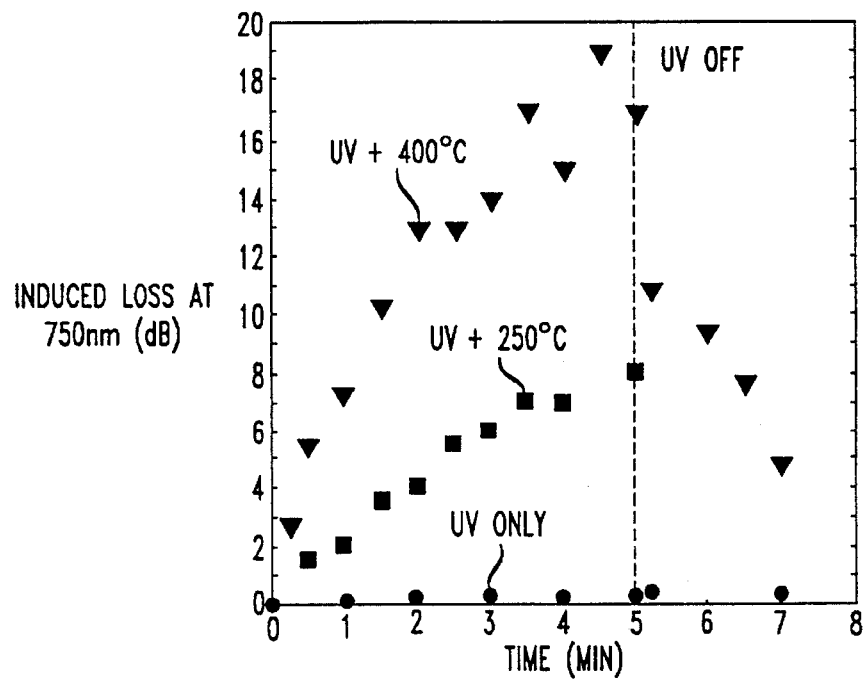
Figure 7:
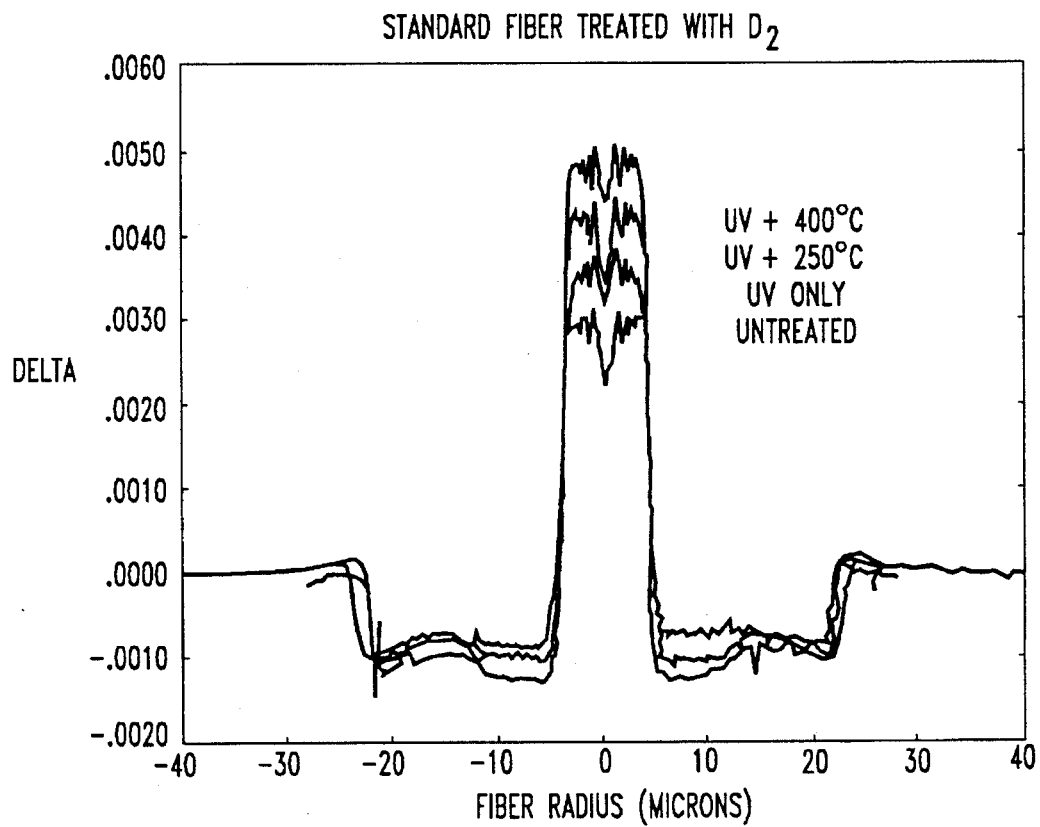

Similar experiments were done using deuterated 5D fibers. In this case the OD overtone could not be used to monitor the extent of the reaction, since its absorption wavelength (1.9 μm) was beyond our measurement range. Instead, loss changes in the visible wavelength range were monitored. For identical exposure conditions the same loss vs. time behaviors were observed for $D_2$ loaded fibers as for $H_2$ loaded fibers. As with the $H_2$ loaded fibers, heating while UV irradiating caused marked increases in the rates of loss increase (in the visible) and in the final induced index change. FIGS. 6 and 7 show the loss changes and refractive index profiles for fibers that were UV irradiated without direct heating and for fibers that were heated to 250° and 400° C. during the irradiation. It is interesting to note that the refractive index of the $GeO_2$ doped MCVD deposited cladding (5<r<12 μm) increased significantly in the 400° C. heated sample, but showed little or no change in the sample that was UV irradiated without direct heating. Presumably the $D_2$ reaction rate in the lightly doped cladding was sufficiently low in the absence of heating that the cladding index changes were undetectably small.

To verify that heating alone could not account for the increased reactivity of the fiber $H_2$ loaded 5D fibers were exposed to a hot air gun, at 250° and 440° C., but without any UV irradiation. Loss changes were monitored over a broad spectral range (400–1700 nm). In the first 30 seconds there were often small loss changes at the OH overtone (1.39 μm). Typically these were less than about 0.15 dB/cm. Further heating did not result in additional loss increases. There were no significant loss changes elsewhere in the spectrum. Although the fibers refractive index profiles were not measured it is very unlikely that measurable index changes would have occurred in view of the very small OH increases and the lack of any loss changes at visible wavelengths.

EXAMPLE 2

Figure 8:
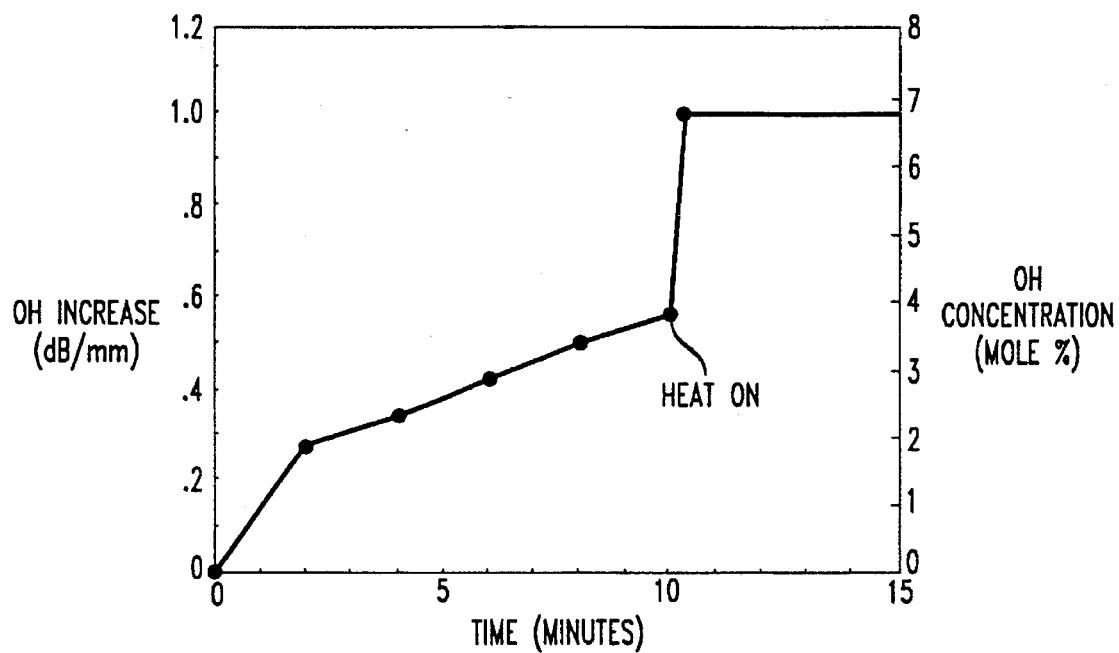

CW Irradiation of $GeO_2$ Doped Fibers $H_2$ loaded fibers were exposed to a tightly focussed CW beam, first without any supplementary heating, and then with direct heating using a 250° C. heat gun. Throughout the experiments the changes in loss, especially those due to OH, were monitored using a white light source and a spectrum analyzer. FIG. 8 shows the OH growth during the experiment where a $H_2$ loaded tethered vehicle fiber was exposed to 120 mW of 244 nm CW radiation that was focussed to a spot about 1 mm×150 μm. Without heating, the OH peak grew about 0.56 dB/mm in 10 minutes—a rate of roughly 0.06 dB/mm/min. Following this exposure the same section of fiber was heated to about 250° C. while continuing the UV irradiation. Within less than 15 seconds the OH peak had risen to 1.0 dB/mm, an incremental change of 0.46 dB/mm over the level that was induced by UV alone—a rate of roughly 1.84 dB/mm/min in a section of fiber that had already had significant depletion of its reactive Ge sites. Similar results were also obtained in another section of tethered vehicle fiber and in a $H_2$ loaded 5D fiber.

EXAMPLE 3

$P_2O_5$ Doped Fiber

Figure 9:
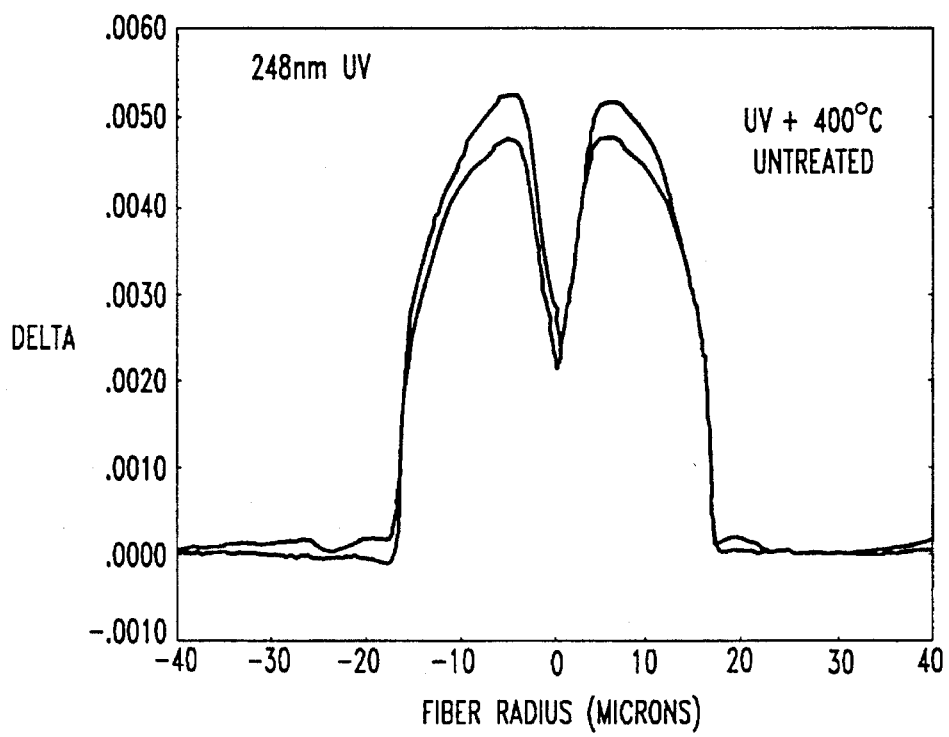

A multimode fiber doped solely with $P_2O_5$ was hydrogen loaded and then UV exposed (248 nm), both with and without heating. Heating, when used, was at 250° and 400° C. Index changes were below our detection limit for the UV exposed samples that were not directly heated. However, for the samples that were heated during the UV exposure there were discernable index increases of 0.0004 to 0.0007, at 250° and 400° C. respectively. FIG. 9 shows a clear index increase in the $P_2O_5$ doped core of a sample that was heated to 400° C. during the UV irradiation. The $P_2O_5$ doped glass appears to have behavior that is qualitatively similar to that seen for $GeO_2$ doped glass—i.e. both show a thermally enhanced UV photosensitivity.

In the above examples, separate sources were used to provide heat and actinic radiation. Alternatively, the glass can be doped with transition-metal dopants such as chromium oxide which will absorb ultraviolet radiation and produce local heating. In this event a single ultraviolet source can simultaneously provide both heating and actinic radiation.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

We claim:

1. A method for increasing the index of refraction of selected portions of a glass body comprising the steps of:

providing a body comprising glass;

diffusing hydrogen or deuterium into at least said selected portions of said glass body;

heating at least said selected portions to a temperature in excess of 150° C. and, while maintaining the temperature of at least the selected portions in excess of 150° C. exposing said selected portions to ultraviolet radiation to increase the index of refraction by at least $5\times10^{-5}$.

2. The method of claim 1 wherein said glass body is an optical fiber.

3. The method of claim 1 wherein said glass body is a planar optical waveguide.

4. The method of claim 1 wherein said diffusing is by exposing said glass to said hydrogen or deuterium at a pressure in the range of 14–11,000 p.s.i.

5. The method of claim 1 wherein said glass body comprises silica doped with $GeO_2$.

6. The method of claim 1 wherein said glass body comprises silica doped with $P_2O_5$.

7. The method of claim 1 wherein said exposing to ultraviolet radiation is exposing to a linear sequence of spaced intensity peaks to define a Bragg grating.

8. The method of claim 1 including the step of discontinuing said ultraviolet exposure and further maintaining the temperature of at least said portions in excess of 150° C. in order to enhance the stability of the device.

9. The method of claim 1 wherein said heating is by application of infrared radiation.

* * * * *